United States Patent
Karasyuk et al.

(10) Patent No.: US 7,847,940 B2
(45) Date of Patent: Dec. 7, 2010

(54) METHODS AND APPARATUS FOR CORRECTING BANDING OF IMAGED REGULAR PATTERNS

(75) Inventors: Valentin Karasyuk, Vancouver (CA);
Harry R. Zwicker, Glen Mills, PA (US);
Wilson D. Cheung, Claymont, DE (US);
Jonathan V. Caspar, Henry Clay Village, DE (US); Sina Afrooze, Coquitlam (CA)

(73) Assignee: Eastman Kodak Company, Rochester, NY (US)

( * ) Notice: Subject to any disclaimer, the term of this patent is extended or adjusted under 35 U.S.C. 154(b) by 708 days.

(21) Appl. No.: 11/886,754

(22) PCT Filed: Apr. 6, 2006

(86) PCT No.: PCT/CA2006/000538
§ 371 (c)(1),
(2), (4) Date: Sep. 20, 2007

(87) PCT Pub. No.: WO2006/105667
PCT Pub. Date: Oct. 12, 2006

(65) Prior Publication Data
US 2009/0066796 A1    Mar. 12, 2009

Related U.S. Application Data

(60) Provisional application No. 60/668,799, filed on Apr. 6, 2005.

(51) Int. Cl.
*G01J 3/46* (2006.01)
*G01B 11/24* (2006.01)

(52) U.S. Cl. .......... 356/402; 356/608; 356/610; 356/614; 430/7; 430/200; 430/300; 430/309; 347/241

(58) Field of Classification Search .......... 356/402, 356/608–610, 614–624; 430/7, 200, 300, 430/302, 292, 309; 347/241
See application file for complete search history.

(56) References Cited

U.S. PATENT DOCUMENTS

| | | | |
|---|---|---|---|
| 4,804,975 A | 2/1989 | Yip | |
| 4,965,242 A | 10/1990 | DeBoer et al. | |
| 5,278,578 A | 1/1994 | Baek et al. | |
| 5,510,896 A | 4/1996 | Wafler | |
| 5,517,359 A | 5/1996 | Gelbart | |
| 5,546,165 A | 8/1996 | Rushing et al. | |
| 6,146,792 A | 11/2000 | B-Fincher et al. | |
| 6,285,488 B1 | 9/2001 | Sandstrom | |
| 6,618,158 B1* | 9/2003 | Brown et al. | 358/1.13 |
| 6,832,552 B2 | 12/2004 | Patten et al. | |
| 6,957,773 B2 | 10/2005 | Gelbart | |
| 7,056,643 B2* | 6/2006 | Ray et al. | 430/273.1 |
| 7,081,322 B2* | 7/2006 | Ray et al. | 430/5 |
| 7,598,008 B2* | 10/2009 | Caspar et al. | 430/7 |

FOREIGN PATENT DOCUMENTS

| | | |
|---|---|---|
| CA | 2345908 A1 | 11/2001 |
| CA | 2415612 A1 | 7/2003 |
| EP | 0434449 A2 | 6/1991 |

* cited by examiner

*Primary Examiner*—L. G Lauchman
(74) *Attorney, Agent, or Firm*—Nelson Adrian Blish

(57) ABSTRACT

A multi-channel imaging head is calibrated in accordance with a pre-determined regular pattern to minimize swath-to-swath and inter-swath variations during the imaging of the regular pattern. The imaging parameters of the imaging head are optimized in accordance with the pre-determined regular pattern.

20 Claims, 14 Drawing Sheets

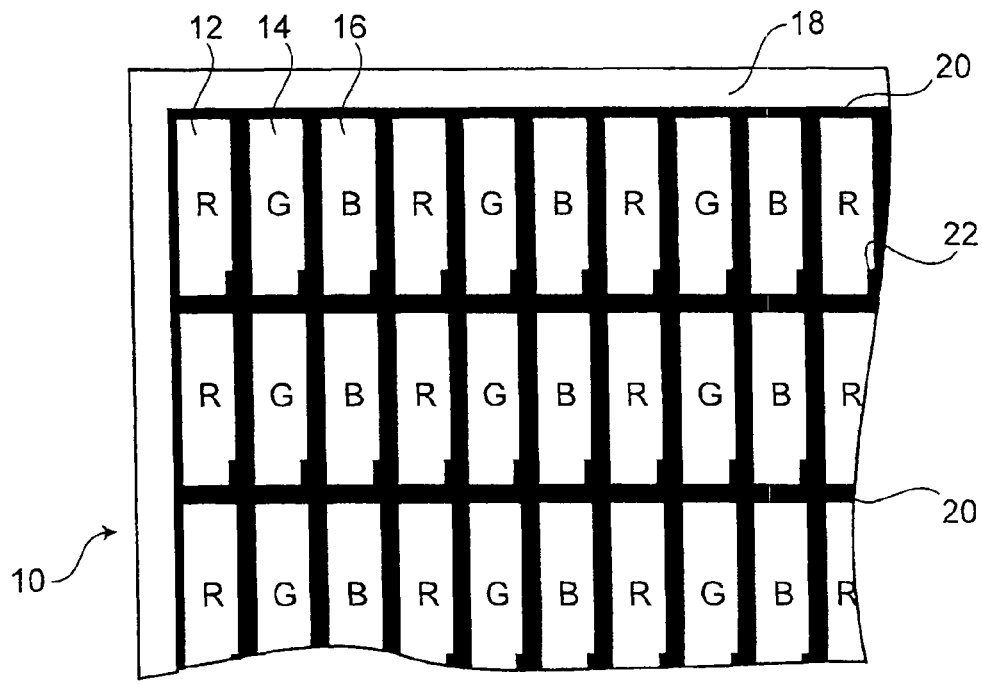
FIG. 1-A
PRIOR ART
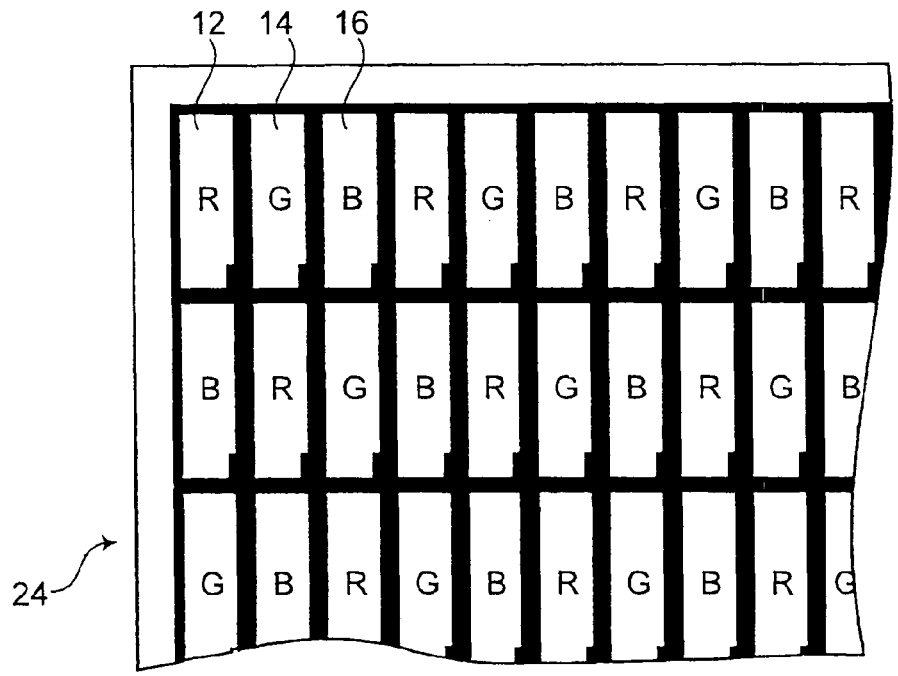
FIG. 1-B
PRIOR ART

METHODS AND APPARATUS FOR CORRECTING BANDING OF IMAGED REGULAR PATTERNS

REFERENCE TO RELATED APPLICATION

This application is the national stage of PCT/CA2006/000538. This application claims priority from U.S. Patent Application No. 60/668,799 filed on Apr. 6, 2005 which is hereby incorporated herein by reference. For purposes of the United States this application claims the benefit of U.S. Patent Application No. 60/668,799 under 35 U.S.C. §119.

TECHNICAL FIELD

The invention relates to imaging systems and to methods for evaluating and correcting banding resulting from the imaging of regular patterns.

BACKGROUND

Common techniques for fabricating displays and semiconductor electronic devices involve several imaging steps. Typically, in each step, a substrate coated with a resist or other sensitive material is exposed to radiation through a photo-tool mask to effect some change. Each step has a finite risk of failure. The possibility of failure at each step reduces the overall process yield and increases the cost of the finished article.

A specific example is the fabrication of color filters for flat panel displays such as liquid crystal displays. Color filter fabrication can be a very expensive process because of the high cost of materials and low process yield. Traditional photolithographic processing involves applying color resist materials to a substrate using a coating technique such as spin-coating, slit and spin or spin-less coating. The material is then exposed via a photo-tool mask and developed.

Direct imaging has been proposed for use in the fabrication of displays and in particular color filters. A color filter substrate, also known as a dye-receiving element, is overlaid with a dye donor element. The dye donor element is image-wise heated to selectively transfer a dye from the donor element to the receiving element. Image-wise heating is typically done by means of a laser beam. Diode lasers are particularly preferred for their ease of modulation, low cost and small size.

"Dye transfer" processes are a particular type of "thermal transfer" process. Other thermal transfer processes include: laser-induced melt transfer, laser-induced ablation transfer, and laser-induced mass transfer. The term "thermal transfer process" is not limited to the image-wise transfer of dyes. As used herein, the term thermal transfer process includes the image-wise transfer of donors coated with pigments or other colorant compositions.

Direct imaging systems typically employ hundreds of individually modulated beams in parallel to reduce the time taken to complete images. Imaging heads with large numbers of such "channels" are readily available. For example, one model of SQUAREspot® thermal imaging head manufactured by Kodak Graphic Communications Canada Company, British Columbia, Canada has 960 independent imaging channels, each channel having power in excess of 25 mW. The array of imaging channels can be controlled such that an image is written in a series of swaths which are closely abutted to form a continuous image.

One problem with multi-channel imaging systems is that it is extremely difficult to ensure that all channels have identical imaging characteristics. Different imaging characteristics among channels may result from differences in the output radiation that the channels project upon the imaged media. Variations in the output radiation emitted by the array of imaging channels may originate from channel-to-channel variations in power, beam size, beam shape and/or focus. These variations contribute to the production of a common imaging artifact known as banding. Banding is often particularly prominent in the area between two successively-imaged swaths. This is primarily because the end of the last imaged swath and the beginning of the next imaged swath are usually written by channels at opposite ends of a multi-channel array. As such, these channels are more likely to have differing imaging characteristics. A gradual increase in spot size from channel-to-channel may or may not be visible within the swath itself, but when a swath is abutted with another swath, the discontinuity in spot size at the swath boundary may result in a pronounced artifact in the image. Banding can be a function of any overlap or separation of successive swaths as well as channel variance within each of the respective swaths.

Accurate swath positioning is necessary for mitigating banding but, in itself, cannot fully eliminate banding. Any remaining levels of banding therefore need to be reduced or masked by adjusting the channels within the swath itself. This can require a careful alignment and calibration of the channels within the array. One could attempt to establish a uniform power distribution across all the channels in the imaging array to minimize inherent channel-to-channel differences. However, because of the role of other contributions mentioned earlier (e.g. beam size, beam shape, and focus) power uniformity across the imaging channels of the array does not guarantee reduced banding.

Banding is not solely attributable to the imaging system. The imaged medium may also contribute to banding. Various methods for evaluating banding involve inspection or characterization of the imaged medium.

Several problems may arise when a thermal transfer process is applied in the production of color filters. Some common color filters have a repeating pattern of spaced-apart color element lines. Each of the lines corresponds to one of three colors. Each of the lines is typically smaller in width than the swath imaged by the imaging head. Consequently, inter-swath banding may result wherein varying color transfer efficiency causes variations between different ones of the color element lines, as well as within individual lines. Since the lines form a repeating pattern, a visual beating readily perceptible by the human eye may result, consequently reducing the quality of the color filter.

Some prior art multi-channel imaging systems have employed calibration methods that attempt to create uniformity in the output radiation emitted by all of the imaging channels in the array, or alternatively, to create uniformity in the optical properties across the entire width of a swath in an image that has been imaged by all of the imaging channels in the array. The inventors have determined that such calibration methods are not typically well suited for imaging repeating patterns of features in which inter-swath banding is present since each of the features are smaller in width than the width of the imaged swath.

Patents and patent applications in the field of imaging include:

| | |
|---|---|
| U.S. Pat. No. 4,965,242 | De Boer et al.; |
| U.S. Pat. No. 4,804,975 | Yip; |
| U.S. Pat. No. 6,146,792 | Blanchard-Fincher et al.; |
| EP 434,449 | Sprague et al.; |

-continued

| U.S. Pat. No. 6,832,552 | Patten et al.; |
| U.S. Pat. No. 5,546,165 | Rushing et al.; |
| U.S. Pat. No. 6,618,158 | Brown et al.; and |
| U.S. Pat. No. 5,278,578 | Back et al. |

There remains a need for imaging methods that lessen the visibility of swath-to-swath and inter-swath banding, especially in the imaging of regular patterns such as required by color filters.

SUMMARY

One aspect of the invention provides methods and apparatus for calibrating multiple-channel imaging heads. In a method according to an embodiment of the invention a multiple-channel imaging head is used to image a regular pattern of features within one or more swaths imaged by the imaging head. The regular pattern of features repeats at least in a sub-scan direction, and includes at least a first feature that is imaged by a first portion of the multiple imaging channels, and a second feature that is imaged by a second portion of the multiple imaging channels. Both the first feature and the second feature are imaged within the same swath of the one or more swaths. A scanner determines an optical property of each of the first feature and the second feature. An image data processor analyzes that scanned data and provides correction instructions based at least in part on the optical property. The correction instructions are used for adjusting at least one imaging channel within at least one of the first portion of the plurality of imaging channels and the second portion of the plurality of imaging channels such that the optical property associated with each of the first feature and the at least a second feature is made substantially equal upon a subsequent imaging of the regular pattern of features.

BRIEF DESCRIPTION OF DRAWINGS

Non-limiting embodiments of the invention are described below with reference to the accompanying drawings, in which:

FIG. 1A is a plan view of a portion of a prior art color filter configuration;

FIG. 1B is a plan view of a portion of another prior art color filter configuration;

DESCRIPTION

Figure 2:
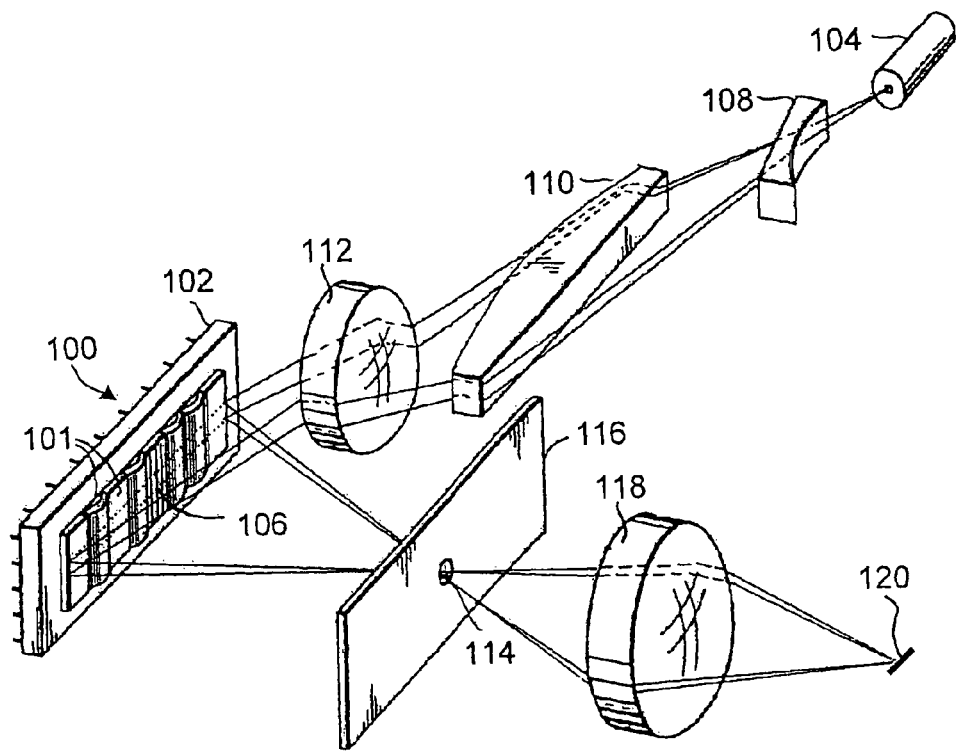
FIG. 2 is a perspective view of the optical system of a prior art multi-channel imaging head.

Methods and apparatus for imaging patterns made up of repeating features, such as stripes, blocks or the like, with multi-channel imagers can adjust individual channels to reduce banding. Such methods and apparatus may be applied, for example, in fabricating color filters. The channels are adjusted based upon optical characteristics of imaged patterns.

Color filters for LCD display panels have color elements that may be arranged in any of a number of configurations. Stripe configurations have alternating columns of red, green and blue colors. Mosaic configurations have color elements that alternate in both directions. Delta configurations have red, green and blue filter elements are arranged in triangular patterns.

FIG. 1A shows a portion of a stripe configuration color filter 10. Color filter 10 comprises a plurality of red, green and blue color elements 12, 14 and 16 formed in alternating columns on a substrate 18. Color elements 12, 14, 16 are outlined by portions of a black matrix layer 20, which separates the elements and prevents any backlight from leaking between the elements. The columns are commonly imaged in elongated stripes and then subdivided by black matrix 20 into individual color-elements 12, 14, 16. Black matrix 20 may include areas 22 to mask driving transistors (not shown).

FIG. 1B shows a color filter 24 having a mosaic configuration. The only difference between filters 10 and 24 is the layout of color elements, 12, 14 and 16, which alternate in color down the columns as well as across the columns in filter 24. Color filters are not limited to red, green and blue colors. Color filters may also have other color combinations.

Typically, during the manufacture of color filter 10, each of color elements 12, 14, 16 can either partially or completely overlap the respective portions of the black matrix 20 that outline each respective color element. Permitting overlap with the black matrix significantly reduces the registration issues that would be encountered if one were to try to image each color element exactly within the boundaries of the portions of the black matrix 20 that delineate the color element.

Where a thermal transfer process is used to produce color elements, edge discontinuities and various artifacts such as pinholes may occur when the corresponding color donor is removed post-imaging. These artifacts typically occur when the donor material that has been transferred at the edges lacks adhesive peel strength sufficient to remain attached to the receiving element when the color donor is peeled off. Overlapping the black matrix 20 has the additional advantage of hiding such edge discontinuities and helps to ensure that the desired contrast between the respective color elements is ensured by reducing the occurrence of clear areas and voids within the color elements themselves.

In an embodiment of this invention, a color filter is fabricated by a laser-induced thermal transfer process. This process involves directly imaging a color donor element placed in close contact with a receiver substrate. The receiver substrate typically has a black matrix formed on it. Although the black matrix can itself be produced by a thermal transfer process, it is typically formed by lithographic techniques which can provide the required accuracy as well as avoiding any edge artifacts and discontinuities within the black matrix. The colorant is image-wise transferred onto the substrate using a multi-channel light-valve-based imaging system.

Red, green and blue portions of the filter are imaged in separate steps. Each imaging step involves replacing the preceding color donor with the next color donor to be imaged. Each of the red, green and blue portions of the filter is transferred to the receiver substrate such that each of the color portions is in register with the respective portions of the black matrix that delineate each of the color elements. After all the color elements have been transferred to the substrate, the color filter typically undergoes an additional annealing step to harden the transferred color filter elements.

FIG. 2 shows a prior art light-valve-based imaging head. A linear light valve array 100 comprising a plurality of deformable mirror elements 101 is fabricated on a silicon substrate 102. A laser 104 generates an illumination line 106 using an anamorphic beam expander comprising cylindrical lenses 108 and 110. U.S. Pat. No. 5,517,359 to Gelbart describes a method for forming an illumination line. Illumination line 106 is laterally spread across the plurality of elements 101 so that each of the elements 101 is illuminated by a portion of illumination line 106.

A lens 112 focuses the laser illumination from elements 101 through an aperture 114 in an aperture stop 116. When any particular element 101 is not actuated, aperture 114 transmits light from that element. Light from actuated elements is blocked by aperture stop 116. A lens 118 images light valve 100 to form an imaging swath 120. Imaging swath 120 comprises a plurality of individual image-wise modulated beams, which may be scanned over the area of a substrate to form an image.

When imaging rigid substrates, as is common in fabricating display panels, the imager used is usually a flatbed imager that secures a receiver substrate in a flat orientation. The receiver substrate, or the array of imaging beams, or a combination of both, is displaced to image the swaths. U.S. Pat. No. 6,957,773 to Gelbart discloses an example of a high-speed flatbed imager suitable for display panel imaging. Alternatively, flexible substrates may be secured to either the external or the internal surface of a drum imager to affect the imaging of the swaths. Even a substrate that is traditionally thought of as rigid, such as glass, may be imaged on a drum imager if the substrate is sufficiently thin and the diameter of the drum is sufficiently large.

Figure 3:
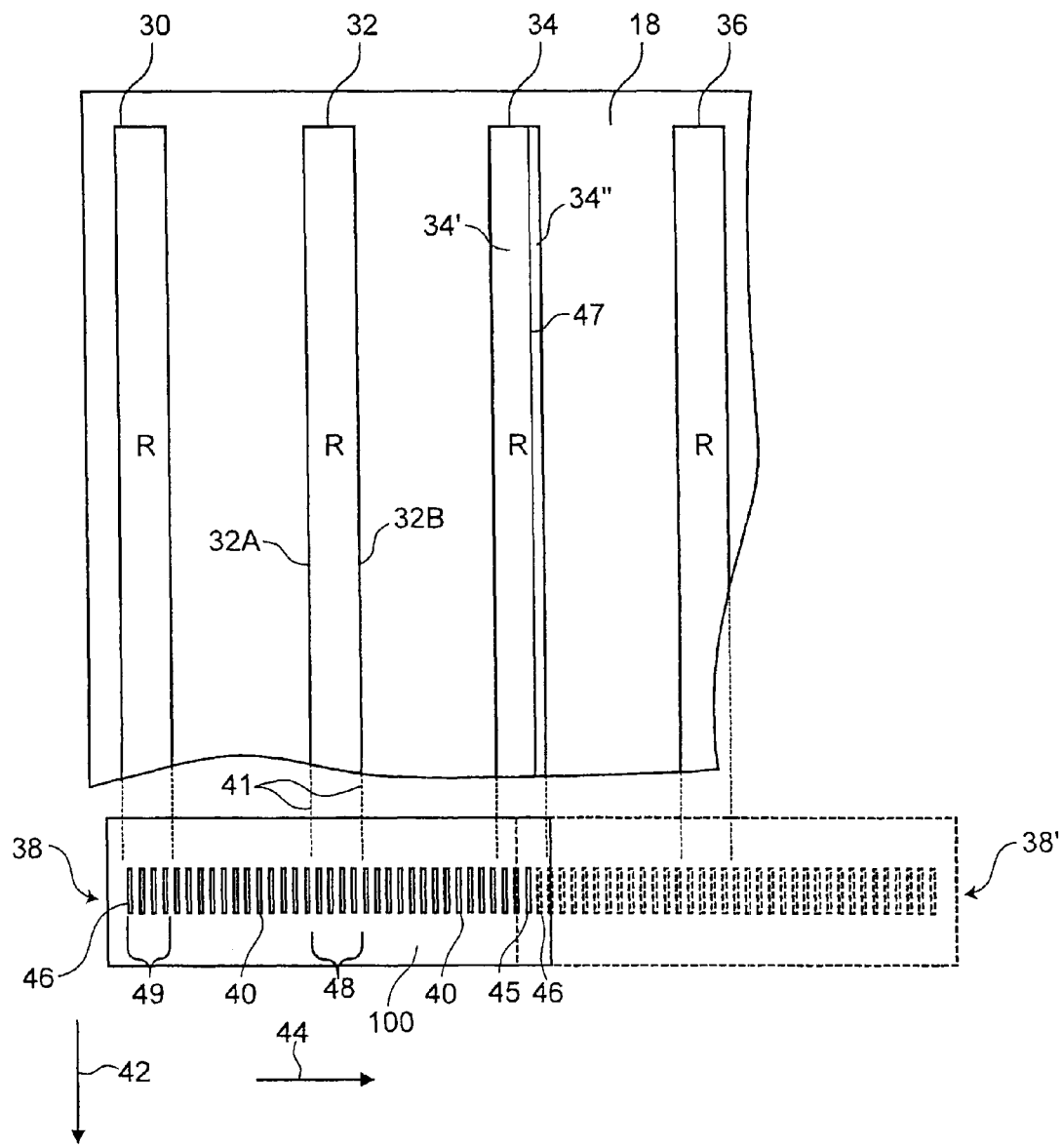
FIG. 3 is a schematic view of a light valve shown in relation to an imaging substrate and depicting a prior art imaging method.

A prior art method of direct imaging of a color filter is schematically depicted in FIG. 3. A portion of a color-filter substrate 18 has been patterned with a plurality of red stripes 30-36 in a thermal transfer process. The width of each of the red stripes need not only be as wide as the visible width of the color elements but can also be of sufficient width to partially overlap the black matrix vertical segments (not shown) that delineate each red element within each respective stripe. A light valve 100 (e.g. as found in a multi-channel imaging head) has a plurality of individually-addressable imaging channels 40, and is located in a first position 38. FIG. 3 depicts the correspondence between imaging channels 40 and the transferred pattern by broken lines 41. While light valve 100 is shown in FIG. 3 at the same scale as the imaged pattern, FIG. 3 is only schematic. FIG. 3 shows the correspondence between the imaging channels 40 and the patterns 30-36 being written and not necessarily a physical relationship. In practice, as shown in FIG. 2, light valve 100 may be imaged onto the substrate by a lens 118, which may reformat the size and shape of the imaging swath at the plane of the substrate.

The beams generated by light valve 100 are imaged over the substrate in a main-scan direction 42 while being image-wise modulated according to the pattern to be written. Sub-groups of channels like channel sub-group 48 are appropriately driven to produce one or more imaging beams wherever it is desired to form a feature, while other channels not corresponding to the pattern will be off. If all the channels 40 are driven to produce corresponding pixels, light valve 100 can produce an imaged swath having a width related to the distance between the first pixel imaged by the first channel in the array and the last pixel as imaged by the last channel in the array.

Since receiver substrate 18 is usually too large to be imaged within a single swath, multiple swaths will likely be required to complete the imaging. In this case, light valve 100 is translated in sub-scan direction 44 after each swath is imaged so that a subsequent imaged swath will generally be lined up alongside the previously-imaged swath. As represented in FIG. 3, movement of light valve 100 along sub-scan direction 42 occurs after the imaging of each swath in the main-scan direction 42 is completed. Alternatively, receiver substrate 18 may be moved in the main-scan direction with respect to the light valve 100. Alternatively, the light-valve may be translated in the sub-scan direction in synchrony with the main-scan motion, in order to compensate for potential skew between the main-scan direction effected by the imaging system, and the desired placement of the image with respect to the receiver substrate. Alternatively, for a drum type scanner it is possible to simultaneously scan in both the main-scan and sub-scan directions while imaging, thus writing the image in a helix.

There are several options for aligning a previously-imaged swath to a subsequently-imaged swath. These options may include overlapping the previously and subsequently imaged swaths by one or more channel widths as a first step towards combating swath edge effects. Alternatively, the first imaged channel of the subsequent imaged swath can be spaced from the last imaged channel of the previous imaged swath by a distance corresponding to the spacing between adjacent channels on the light valve. Alternatively, for some imaged patterns, the first imaged channel of the subsequent imaged swath may be spaced from the last imaged channel by a distance different from the spacing between adjacent channels on the light valve.

Referring to FIG. 3, Red stripes 30, 32 and the portion 34' of stripe 34 are written while the beams image a first swath by moving the imaging beams relative to substrate 18 in main scan direction 42. On completion of the first swath the light valve 100 is displaced in the sub-scan direction 44 from position 38 to a new position 38', shown in broken lines. The sub-scan displacement corresponds to the number of channels available on the light valve 100 (in this example, 35 channels). After the sub-scan displacement, light valve 100 is at position 38' and has its first channel 46 adjacent to the previous position of its last channel 45. The beams of light valve 100 can then image another swath that includes portion 34" of stripe 34. It is very difficult to avoid the appearance of a visible discontinuity, shown as line 47, at the boundary between portions 34' and 34" of stripe 34. Even very small power variations (on the order of 1%) in the output power of the imaging channels can affect the optical density of the transferred color by varying the amount of color that is transferred, or by inducing small pockets or bubbles within the transferred material. The visible discontinuity between adjacent imaged swaths is an example of "swath-to-swath" banding.

Swath-to-swath banding can be emphasized when a regular pattern such as a color filter is produced by a thermal transfer method. Density variations in transferred color may occur at the outlying edges of the imaged swath since less heat will typically be deposited in imaging the areas around the edges of the swath as opposed to the central areas of the swath. Typically, less colorant will be transferred in the areas that receive less heat and more colorant will be transferred in areas that receive more heat. Other phenomena attributable to the thermal transfer process and media (i.e. phenomena other than the amount of thermal energy transferred) can also cause optical density variations within each swath. Density variations may also be observed under certain conditions in which the edge of the swath that abuts previously imaged areas behaves differently from the edge of the swath that abuts non-imaged areas.

Variations in the thermal transfer may arise when a second color donor is overlaid over a pattern imaged on the receiver substrate by a previously-imaged color donor. This situation may create variations in the spacing between the second color donor and the receiver substrate thus affecting the degree of transfer. Typical color donors for the thermal transfer fabrication of color filters have limited imaging latitude and are thus considered to have non-linear imaging properties. Furthermore, there may be non-local effects in which the presence or absence of a given feature within the imaged swath may affect the density of a feature elsewhere within the swath.

Banding can also occur as a result of variations in color transfer within individual swaths. The uniformity of the color transfer may not be consistent within an imaged swath even if the array of channels used to image the swath had previously been calibrated to produce a swath comprising uniform optical properties (such as optical density) across an entire width of the swath with all channels turned on.

Referring to FIG. 3, outboard stripe 30 is imaged by channel sub-group 47 while inboard stripe 32 is imaged by channel sub-group 49. The uniformity of the color transferred from the color donor to the receiver substrate 18 may not be consistent within a given imaged swath due to variations in the temperatures created by imaging a given stripe or by other mechanisms attributable to the non-linear imaging characteristics of the thermal transfer process.

Further, the uniformity of the color transferred may also not be consistent within the swath even if each of the channels in the array has been calibrated to produce substantially the same output radiation conditions in each of the channels. Specifically, since stripe 30 is imaged near the edge of the swath, it may receive less thermal energy due to its location than stripe 32 that is imaged within the central portion of the swath. Consequently, the thermal transfer process itself may lead to density variations within the regular pattern of stripes imaged within the swath. Since the stripes are imaged in a regular pattern, any variation in the optical density among the stripes can lead to a visual beating that degrades the quality of the color filter. Such visual beating within a swath is an example of inter-swath banding.

Optical density variations may also manifest themselves within individual imaged stripes. For example, stripe 32 is imaged by the corresponding channel sub-group 48. Since stripe 32 is surrounded by non-imaged areas on both sides, the non-linear imaging characteristics of the thermal transfer process will be emphasized. A reduced amount of color may be transferred to the imaged areas along edges 32A and 32B of stripe 32 since these areas are not heated as much by the outlying members of channel sub-group 48. The inboard members of channel sub-group 48 will typically transfer more color to the inner portions of stripe 32 as a result of spill-over heating from neighboring imaged channels. In this regard, stripe 32 may have an optical density that varies across its width. This variation combined with the regular periodicity of the striped pattern may lead to a visible beating that is readily apparent to the human eye. These artifacts may not be remedied by prior art methods that merely create a uniform power distribution across all the channels in the imaging array. Again, it should be noted that the non-linear imaging characteristics of the thermal transfer process may result from phenomena other than the amount of heat transferred during imaging.

In an example embodiment of the invention, an imaging head comprising an array of imaging channels (e.g. an array of laser beams) is calibrated in accordance with a regular pattern to be imaged. The calibration can be specific to the regular pattern to be imaged (which could be, for example, a pattern of color elements for a color filter). The regular pattern to be imaged includes a regular repeating series of features in which each of the features (for example each stripe in an arrangement of stripes in a color filter) is smaller in width than the width of a swath imaged by the array of channels. Sub groups of channels within the array of imaging channels are calibrated both to minimize swath-to-swath banding between adjacent swaths as well as inter-swath banding that results from the imaging of the regular pattern itself.

The regular pattern of features may comprise series of continuous or interrupted stripes as used in a color filter (e.g. a filter of the type illustrated in one of FIGS. 1A and 1B). According to some embodiments of the invention, color filters are created by thermal transfer methods involving the image-wise transfer of a colored donor onto a receiver substrate as an imaging head is imaged across the receiver substrate in a raster scan fashion. A plurality of (e.g. red, green and blue) color donors may be sequentially imaged to image-wise transfer their respective colors onto the receiver substrate. Individual color elements may be delineated by a black matrix. An individual color element may be, for example, on the order of 300 μm in length by 100 μm in width, as delineated by the black matrix.

When color filters are produced with a stripe configuration, the regular pattern of features will typically comprise a series of continuous stripes or lines imaged onto the black matrix such that a continuous row of color elements of a given color is produced. When a mosaic or a delta configuration is employed the regular pattern of features will typically comprise a series of interrupted stripes imaged onto the black matrix such that, for each color, discontinuous rows of color elements are produced.

State-of-the-art imaging heads such as the SQUAREspot® thermal imaging head can comprise imaging channels with a resolution of 5 μm in the sub-scan direction and a swath width of approximately 5 mm. For typical color filters comprising a stripe configuration, such imaging heads may image approximately 16 stripes per color per swath, with each stripe being imaged by approximately 20 channels. It should be noted that each different color donor may have different color transfer characteristics from its counterparts. It is not uncommon for the number of channels used to image stripes of one color to vary slightly from the number of channels used to image stripes of other colors.

Figure 4:
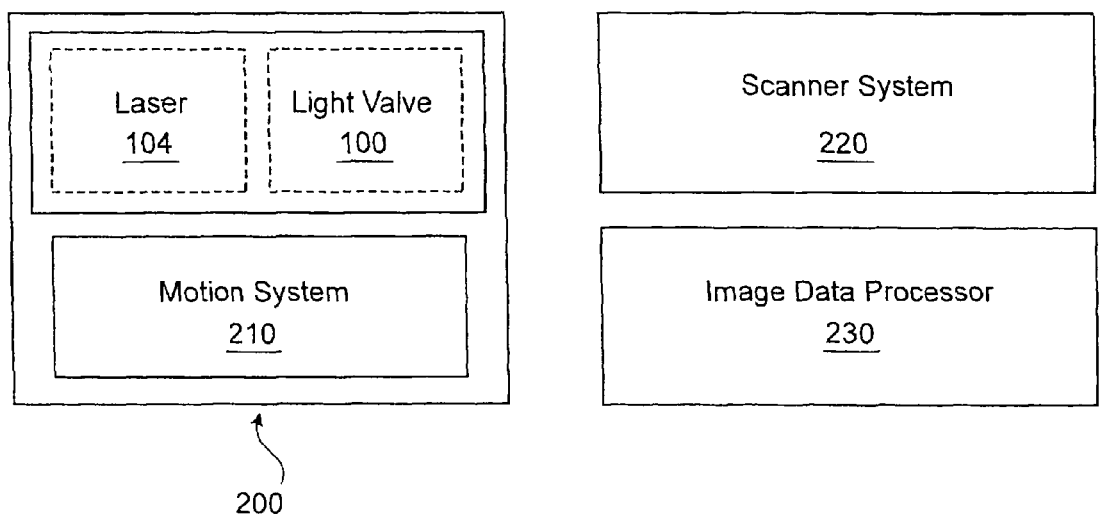
FIG. 4 is a schematic block diagram of an imaging and calibration system according to an example embodiment of the invention.

FIG. 4 is a schematic block diagram of an imaging and calibration system according to an example embodiment of the invention. Such a system may be used for imaging regular patterns such as color filters. The system may perform imaging by a thermal transfer method, for example. The system comprises imaging device 200, which in turn comprises laser 104, light valve array 100, and motion system 210. Other mechanisms for generating multiple imaging channels may also be used. There are many other designs for multi-channel imaging heads. A system according to the invention may work with any suitable multi-channel imaging system.

Motion system 210 is operable for establishing controlled relative motion at least in main-scan direction 42 and sub-scan direction 44 between receiver substrate 18 and light valve array 100, so that receiver substrate 18 may be imaged with the regular pattern in accordance with image data representing the regular pattern to be imaged.

The system further comprises a scanner system 220, operable to characterize an optical property of the regular pattern that is imaged onto receiver substrate 18. Such an optical property may include the optical density or reflectivity of the regular pattern imaged on the receiver substrate 18. Measuring optical density of the recorded regular pattern provides a means to identify variations in the output of the individual channels as well as variations associated with any non-linear imaging characteristics attributable to the thermal transfer method itself. Variations in the optical density measured across the imaged regular pattern provide a means for quantifying the degree of swath-to-swath banding between adjacent swaths as well as inter-swath banding that results within each swath from the imaging of the regular pattern itself. Ideally such a system removes or minimizes the need for subjective human interpretation of any resulting banding. Relying upon the human eye to evaluate banding and other artifacts may not provide satisfactory results in demanding applications such as color filters.

In an example embodiment of the invention, scanner system 220 comprises a flat bed scanner. In another example embodiment, scanner system 220 is incorporated within imaging device 200. Although other image acquisition and measurement devices such as densitometers may be suitable for use as a scanner system 220, high resolution scanners are preferred because of their precise registration, consistent geometric scale, illumination uniformity and massively parallel data acquisition capabilities.

There are trade-offs in choosing the resolution of scanner system 220. Higher resolutions will typically increase scanning time. Lower resolutions will usually complicate separation of neighboring features. Preferably scanner system 220 has a pitch between adjacent scanning elements that is somewhat smaller than the width of the features, e.g. stripes of a color filter, of the regular pattern. Typically, an appropriate scanner pitch is approximately one quarter to one tenth the width of the color filter features.

For color filter applications that comprise interleaved red, green and blue regular patterns, scanner system 220 may comprise red, green and blue channels. The scanned data produced by scanner system 220 will typically produce very large files.

The scanned data is provided to a suitable image data processor 230 that comprises one or more systems controllers that are operable at least for evaluating the scanned data to determine any optical density variations. Image data processor 230 is capable of establishing a correction factor for each of the imaging channels based at least in part on the scanned data. The output of image data processor 230 is typically an adjusted power profile for light valve array 100. Scanned data processing is repeated for each of the color filter colors.

Figure 5:
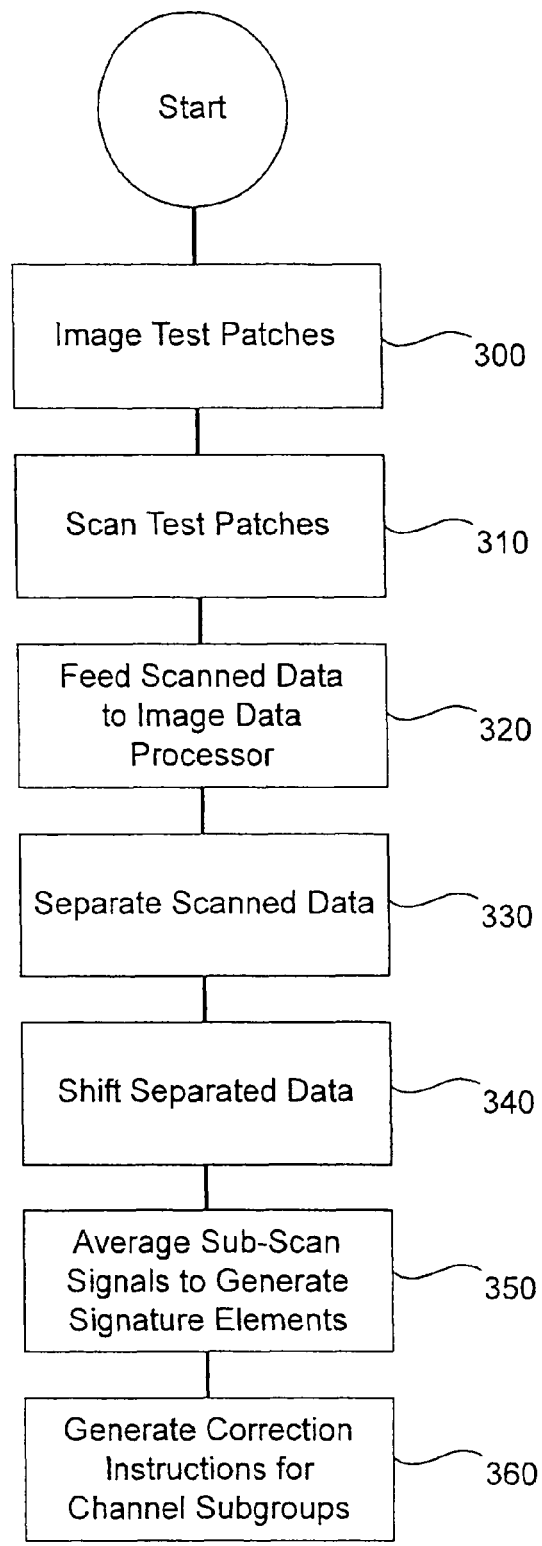
FIG. 5 is a flow diagram showing a sequence of an imaging and calibration method according to an example embodiment of the invention.

FIG. 5 shows a sequence of steps according to an embodiment of the invention. In step 300, a thermal transfer method is employed to image one or more test patches. Each test patch comprises a desired regular pattern. The test patches are imaged by imaging system 200 onto a "dummy" receiver substrate. Alternatively, the test pattern may be imaged onto an unused portion of a receiver substrate to be employed in the production of a color filter.

In an example embodiment of the invention, each test patch is approximately 50 mm wide (i.e. sub-scan direction) by 50 mm long (i.e. main-scan direction). These dimensions are chosen to cover an area sufficiently large to reduce the effects of noise introduced by sporadic variations in the imaging conditions to an acceptable level and to include at least several imaged swaths within the test patch. When imaged with a SQUAREspot® thermal imaging head, such test patches will comprise approximately 10 swaths. Other dimensions may also be suitable for use in the present invention.

Each of the test patches is imaged according to a calibration plot. The same imaging process parameters may be applied to every imaged swath within the test patch. There are a number of imaging process parameters. One of the more important ones is that of establishing a uniform level of exposure across the swath imaged by the plurality of imaging channels. Exposure is defined as the amount of radiant energy per unit area that impinges on the recorded surface during imaging. Establishing this uniform exposure is typically accomplished by balancing the power output of each of the channels.

Preferably prior to calibration, each of the imaging channels is adjusted to provide substantially the same power output. This is not mandatory but helps to baseline the average output power of the entire swath and to facilitate the subsequent calibration by avoiding extreme individual channel power levels. Also, preferably prior to calibration, the media to be imaged is characterized in order to determine appropriate exposure conditions, neither under-exposed nor over-exposed. Each test patch may be imaged according to a calibration plot in which the output power of each imaging channel is changed by 0.5% from test patch to test patch. In this case, a 10% tonal range in the power variation would require 21 test patches. A small portion of each swath can also be held at a constant power from test patch to test patch in order to provide a reference for the imaging response that may be used for a normalization of the resulting calibration data.

Each test patch need not be confined to a regular pattern of features comprising a single color. In the case of color filters, each test patch may contain all of the regular patterns of each color used in the color filter. The regular pattern of features of each specific color is preferably interleaved with regular pattern of each other color in the same sequence that would be used in making actual color filters. Preferably, each specific color donor used to image the test patches is imaged in the same sequence that would be used to image the actual color filter. By imaging the test patches in the same manner as the actual color filter is produced, visual density differences between the differently-colored regular patterns can be identified. These visual density differences may arise because the previous transfer of color to the receiver substrate (as per a previously imaged color donor) will act to further space portions of a subsequently imaged donor from the receiver substrate. Variable spacing may lead to variable density in the thermal transfer process. A black matrix is also preferably provided in each of the test patches since the thickness of the black matrix itself may result in varying gaps between successively imaged color donors and the receiver substrate.

The specific calibration plot used for each of the specific colored regular patterns imaged in each test patch may or may not be the same. Each plot will be dependant on the imaging latitude of each specific color donor used. The baseline channel laser power used for each color in the first of the test patches may be different from color to color. Each specific color imaged in each test patch is imaged in a separate imaging step employing a specific color donor which is removed and replaced with another color donor when the specific color's imaging step has been completed.

The sub-group of channels employed to image a regular pattern corresponding to a specific color within each test patch may, or may not be the same sub-group of channels used to image another color within the test patch. Obviously, the sub-groups of channels used to image the specific colored regular patterns in the test patches should be the same sub-groups of channels used to image the specific colored regular patterns in the actual color filters.

Alternative methods may also additionally image and correct alternate sub-groups of channels. These alternate sub-groups may be employed to image the color filter on a contingency or emergency basis. A contingency basis may include situations when a specific channel in a primary calibrated sub-group of channels becomes disabled and cannot be readily repaired. Alternate calibrated sub-groups of channels will allow color filter production to continue, albeit perhaps at a slower throughput.

In step 310, scanner system 220 scans each of the one or more test patches. Scanner 220 outputs scanner data that represents the two-dimensional (2D) image of each test patch from which the degree of swath-to-swath and inter-swath banding present within the test patch may be analyzed.

Any banding pattern visible in the test patch will be periodic substantially only in the sub-scan direction since the geometry and exposure characteristics are substantially invariant when the regular patterns are imaged along the main-scan direction. Since any banding pattern is substantially periodic in the sub-scan direction, the same numeric information representing the degree of banding present in the test patch can be extracted from an average over the main-scan direction of a plurality of one-dimensional (1D) spatial spectra taken in the sub-scan direction. The imaged pixels recorded by any given imaging channel can be averaged along the main-scan direction without any loss of pertinent information provided that the scanner-to-test patch registration is sufficiently accurate to ensure that the data output of the scanner corresponds to the actual imaged pixels recorded by that given imaging channel along the main-scan direction.

Step 310 comprises scanning each test patch with a scanner system 220 wherein each scan is conducted along substantially the sub-scan direction. The sub-scan axis of the imaged test patch is preferably aligned to be within 5 degrees of the scan direction of scanner system 220. In this configuration, the sampling rate can be controlled by the motion system within the scanner. This orientation can minimize the impact of non-uniformity in illumination and/or detector response along the 1-dimensional scanner sensor.

In another embodiment, the main-scan axis of the imaged test patch is preferably aligned within 5 degrees of the scan direction of the scanner system 220. This configuration may be advantageous for use with certain scanner designs, as it may provide different illumination conditions.

The test patch may contain a regular pattern with a high spatial frequency as in the case of a color filter pattern that comprises an interleaved 100 μm stripes of three different colors. The test patches may be placed out of focus of scanner system 220 in order to limit the optical resolution to approximately one half the scanner system 200 sampling rate. This allows for an anti-aliasing low-pass filter for regular patterns that contain high spatial frequencies. Working out of focus also imitates the spatial resolution of the human eye so that the resulting banding measurement will be consistent with the visual perception of the banding.

The scanned data outputted by scanner system 220 may comprise a two-dimensional bitmap made up of M scanner pixels (i.e. along the main-scan direction 42) and N scanner pixels (i.e. along the sub-scan direction 44). In this context, scanner pixels refer to the pixels outputted by the scanner. In the case of a test patch prepared for color filter applications, the bit map may be a color bitmap comprising data representing the 3 colors used. Each group of N scanner pixels located next to each other along the sub-scan direction 44, will be herein be referred to as a sub-scan line. The scanned data contains M sub-scan lines that are assigned index m=1, 2, ..., M, reflecting the order of the sub-scan lines in the scanned matrix. The separation between the adjacent scanned pixels in each sub-scan line measured in mm is equal to $\Delta=25.4/dpi$, wherein "dpi" represents the scanner sampling rate in dots per inch. The sub-scan coordinate of each scanned pixel is equal to $x_n=n*\Delta$, wherein n=1, 2, ..., N.

Figure 6:
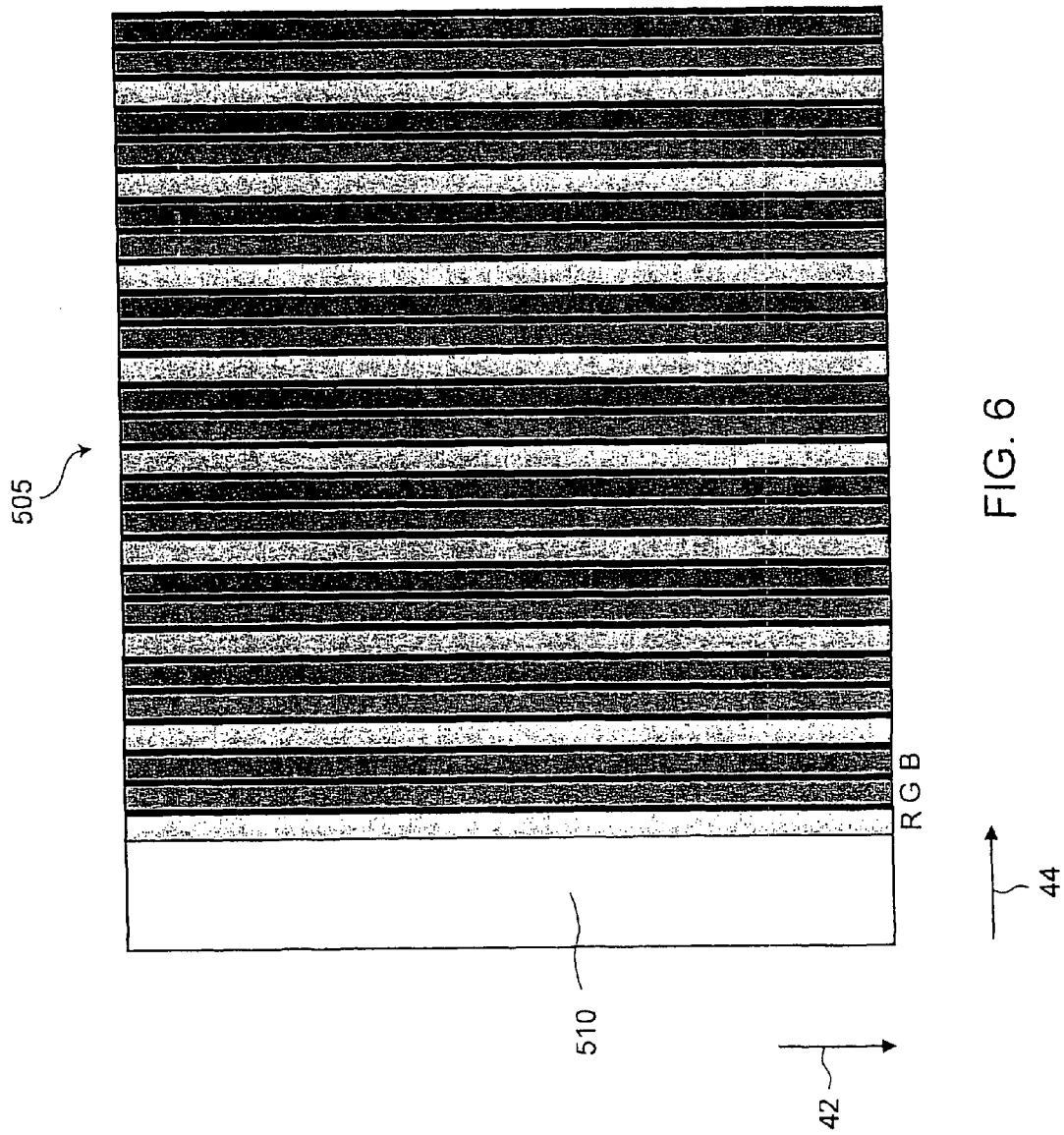
FIG. 6 shows a portion of a scanned color filter.

FIG. 6 shows a portion of a scanned image 505 of a color filter comprising three interleaved regular patterns of red, green and blue stripes. The black matrix is not shown. The scan limits may include a non-imaged margin 510 extending in the main-scan direction 42 and located at the start of the sub-scan coordinate system. The non-imaged margin 510 may be used to reference the start of a given regular pattern within the test patch to the specific sub-groups of imaging channels that imaged that given regular pattern of stripes. Other example embodiments may employ alternative referencing systems, including but not limited to, increasing the imaged exposure of one of the successively imaged features to create an index. The corresponding sub-groups of imaging channels that were operated at these high exposure levels could be referenced to that index and thus allow for the registration of the other regular patterns to the corresponding sub-groups of imaging channels that imaged them.

Referring back to FIG. 5, the scanned data is fed to image data processor 230 for analysis in step 320. In the case of a color filter that includes a plurality of interleaved sets of features arranged in regular patterns, each set of features is separated and analyzed separately in step 330. In the case of a test patch for a color filter that comprises three interleaved sets of repeating colored stripes, the portion of the scanned data representing any given colored stripe may contain components of all three color components (e.g. red green and blue). One may not be able to look at a single colored channel of the scanned data and fully distinguish the scanned image of a given colored regular pattern of stripes.

Different methods may be employed to identify the portions of the scanned data that correspond to areas of a specific color in the test patch. For instance, the red, green and blue stripes will respectively have predominately red, green and blue scanner channel dominance. Taking the red stripe as an example, the red scanner channel components present in the other colored stripe images may be filtered out by determining a ratio of the red scanner channel to the blue and green scanner channels and eliminating the portions of the image in which the ratios of the red scanner channel to the green and the blue scanner channels are below a predetermined threshold set for the identification of the red stripe.

Figure 7:
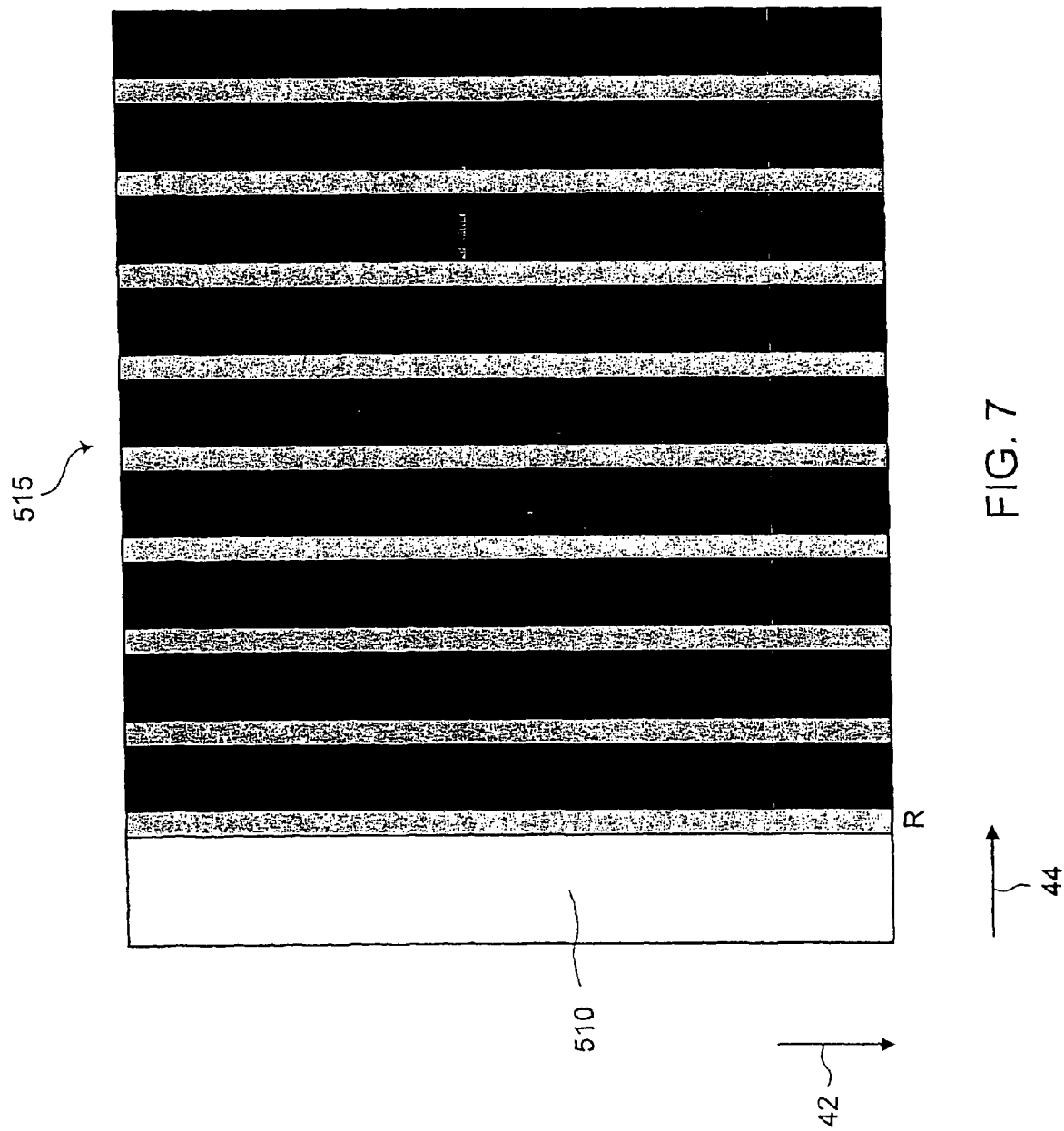
FIG. 7 shows a separated scanned data corresponding to the red features of the color filter of FIG. 6.

The appropriate threshold may be chosen based on a detailed examination of the scanner outputs corresponding to red, green and blue color filter elements, for example, by analyzing data for the different color filter elements in a three-dimensional color space. In this case, the signal levels of the scanned data corresponding to the blue, green and unwanted portions of red scanner channels are set to zero to provide the scanned representation of the separated scanned regular pattern 515 (i.e. in this case the separated scanned data corresponding to the red stripes) as shown in FIG. 7. This process may be repeated for the stripes of other colors in the test patch.

Other example embodiments of the invention may use alternate methods of extracting the appropriate color image of the regular pattern from the scanned data. For instance, the red, green and blue components of the red stripe's color can be measured in the above example and normalized by division of each component by the square root of the sum of squares of the red, green and blue components. After that, the same normalization can be applied to each pixel in the image data and color projection of the pixel color onto the red stripe color can be computed as the sum of the products of the corresponding normalized color components for the image pixel and the measured red stripe color. In this case, the signal levels of the scanned data pixels corresponding to the blue, green and unwanted portions of red scanner channels are set to zero if the above projection is smaller than a predetermined threshold.

For applications that comprise only a single set of regular patterns, this separation step need not occur, and a single channel scanner may be employed. Of further note, if the test patch incorporated a black matrix, portions of scanned data that comprise images of the black matrix cross-bars are easily detected and discarded based on the average scanner signal level.

Scanner system 220 will unlikely have been perfectly aligned to the sub-scan direction of the test patch since a 5 degree tolerance was permitted. Any significant mis-registration should be corrected to ensure that the scanned data corresponding to each feature of the regular pattern can be referenced to the specific sub-group of imaging channels that imaged that feature. Additional mis-registration effects can also arise from oscillation in the stitched swaths during the imaging of the regular patterns that may also cause the scanned image to wobble back and forth in the sub-scan direction.

Referring to FIG. 5, each sub-scan line in the separated scanned data is shifted to a reference position in step 340. In one embodiment of the invention, this shifting is accomplished by first multiplying data in each of the sub-scan lines by a window function such as the Hanning window function given by:

$H(n)=0.5(1-\cos(2\pi(n-1)/(N-1))$.

A one-dimensional Fast Fourier Transform (1D FFT) may then be generated for each sub-scan line in the separated scanned data corresponding to a given regular pattern (i.e. one of the colored stripe sets in the case of a color filter).

Figure 8:
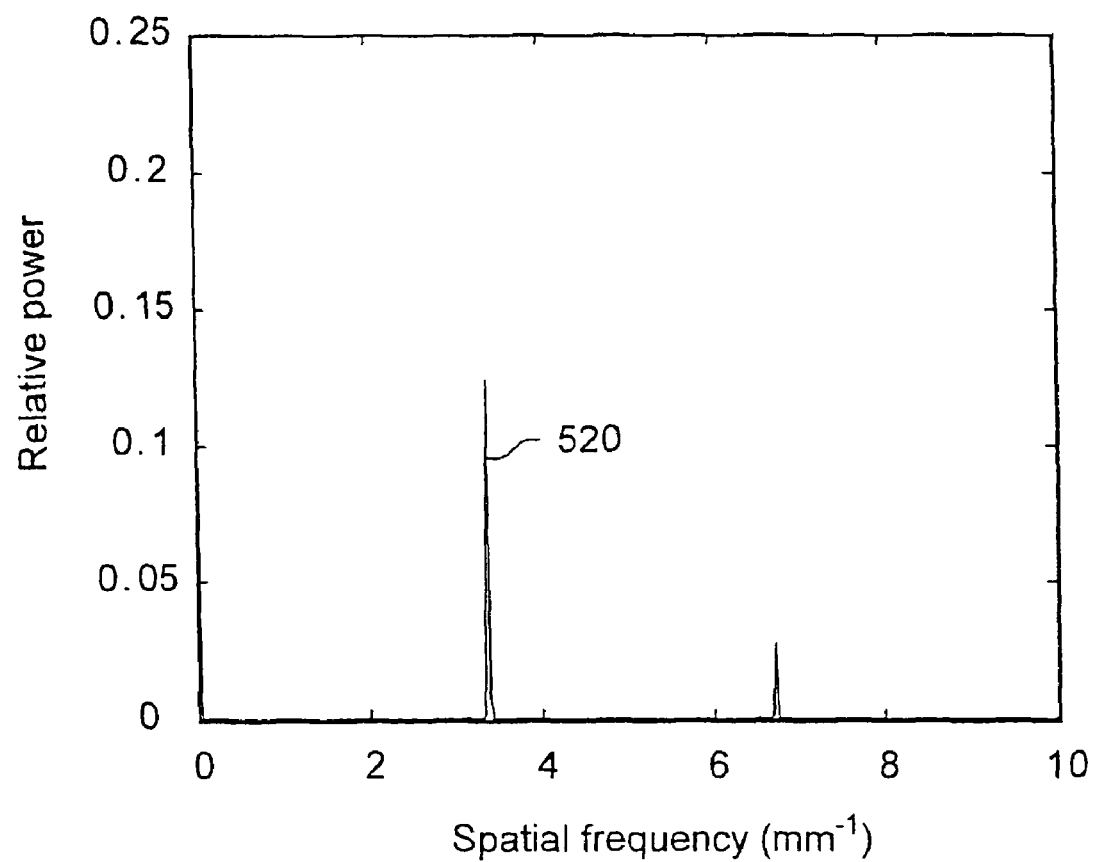
FIG. 8 is a an m-th sub-scan line spatial power spectrum of an image.

Each of the 1D FFT will contain N complex numbers representing the complex Fourier transform amplitudes of the corresponding sub-scan line spatial spectrum. The first N/2 complex amplitudes correspond to positive spatial frequencies measured in mm$^{-1}$ and are equal to $(n-1)/(N*\Delta)$. An m-th sub-scan line spatial power spectrum is shown in FIG. 8 and is equal to the sum of squares of the real and imaginary components of the complex amplitudes. A "dominant peak" 520 is searched for in the vicinity of the spatial frequency 1/L where L is equal to the period of the regular pattern. In the case of color filters, L would be the equal to the spatial period of the each color's elongated stripes. The phase angle $\Phi_m$ of the m-th sub-scan line is calculated as the inverse tangent (arctangent) of the ratio of the imaginary and the real components of the complex amplitude of the dominant peak.

Figure 9A:
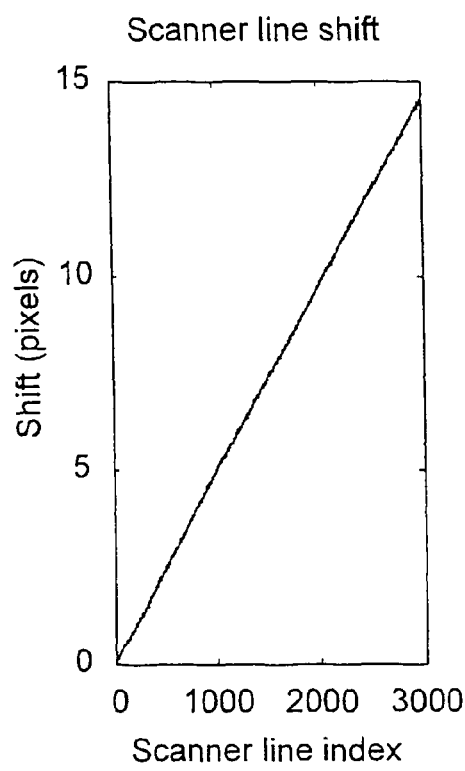
FIG. 9A is a graph of required shift as a function of scan line.
Figure 9B:
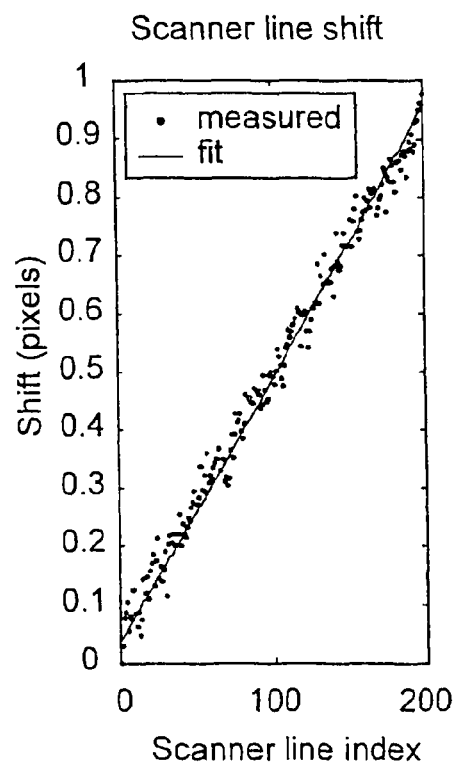
FIG. 9B is a detailed view of a portion of the graph of FIG. 9A.

The graph in FIG. 9A shows the required m-th sub-scan line shift $dx_m$ and is calculated as $dx_m=L=L(\Phi_m/2\pi)$, wherein m=1, 2, . . . , M. Noise in the scanned data can lead to some scatter as shown in graph of FIG. 9B. FIG. 9B shows a small portion of the graph in FIG. 9A. A "best fit" of the m-th sub-scan line shift $dx_m$ can be approximated by, for example, a $5^{th}$ degree polynomial $p(m)=a_0+a_1*m+a_2*m^2+a_3*m^3+a_4*m^4+a_5*m^5$, wherein coefficients $a_0$, $a_1$, $a_2$, $a_3$, $a_4$, and $a_5$ are determined from the least squares fit to $dx_m$ vs. m. Other embodiments of the invention may employ other "best-fit" algorithms.

If the spatial spectrum of each 2D image had been calculated using a two-dimensional fast Fourier transform (2D FFT), the computational time required for this operation would tend to increase as $(N \log_2 N)(M \log_2 M)$ for an N by M pixel image. However, the computational time required to process M 1D FFTs scales as $M(N*\log_2 N)$. This translates into a factor of $\log_2 M$ computational speed improvement in comparison to employing a 2D FFT. With M often in the range of a few thousand, the 1D FFT employed by this embodiment of the present invention provides a significant processing speed improvement over a 2D FFT approach.

Figure 10A:
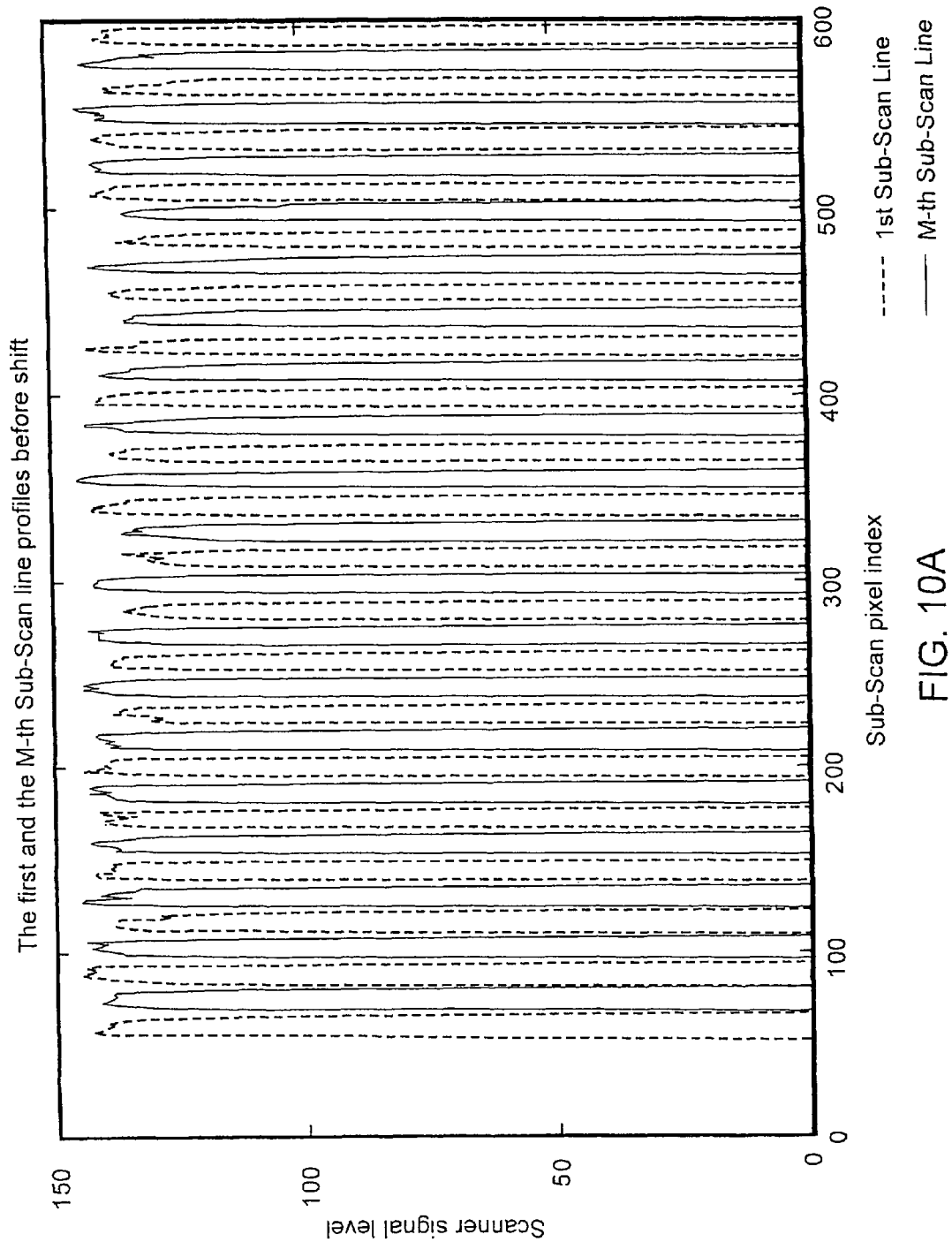
FIG. 10A is a graph of the scanned signal level as a function of the sub-scan pixel index for first and M-th sub-scan lines before applying a shift.
Figure 10B:
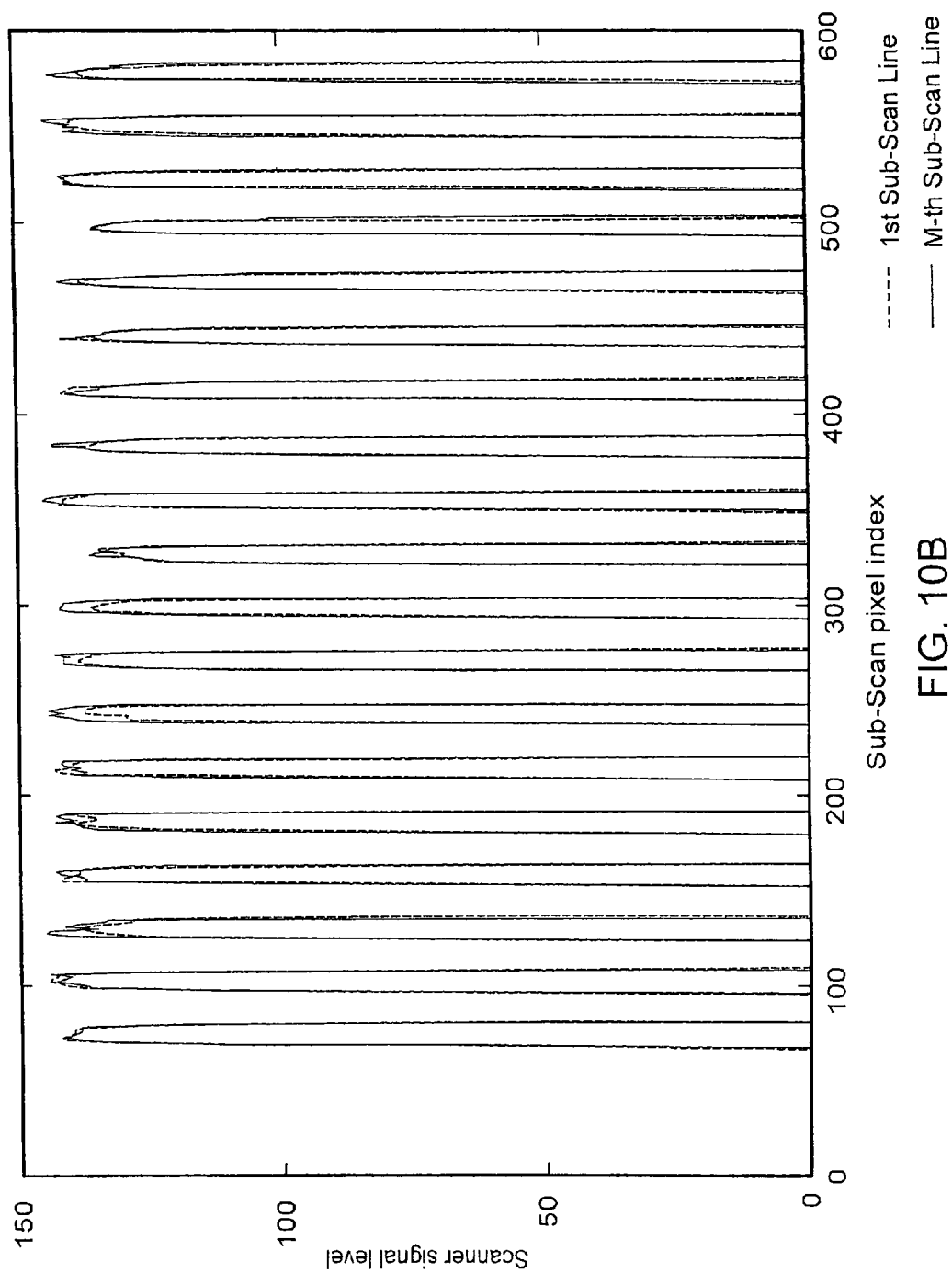
FIG. 10B is a graph of the shifted scanned signal level as a function of the sub-scan pixel index for first and M-th sub-scan lines after applying a shift.

FIG. 10A shows the scanned signal level as a function of the sub-scan pixel index (i.e. n=1 to N) for both the first and M-th sub-scan lines. The other sub-scan line data has been removed for the sake of clarity. A noticeable shift is clearly present. For each sub-scan line m, the scanned signal level is interpolated on the shifted grid $\xi_k=k*\Delta+p(m)$ (wherein k=1, 2, . . . , N) according to the formula $\sigma\xi m(k)=s(x_n)+s(x_{n+1})(\xi_k-x_n)/(x_{n+1}-x_n)$ wherein n is such that $x_n$ is the largest x that is smaller than $\xi_k$. This interpolation on a shifted grid accomplishes image shearing that aligns color filter features along the main-scan axis. FIG. 10B shows the corrected scanned signal level for the first and M-th sub-scan lines. The shifted profiles overlap the scanned signal levels for each sub-scan line and represent the signal density variation in the main-scan direction along each of the members of the regular pattern that was scanned.

Figure 11:
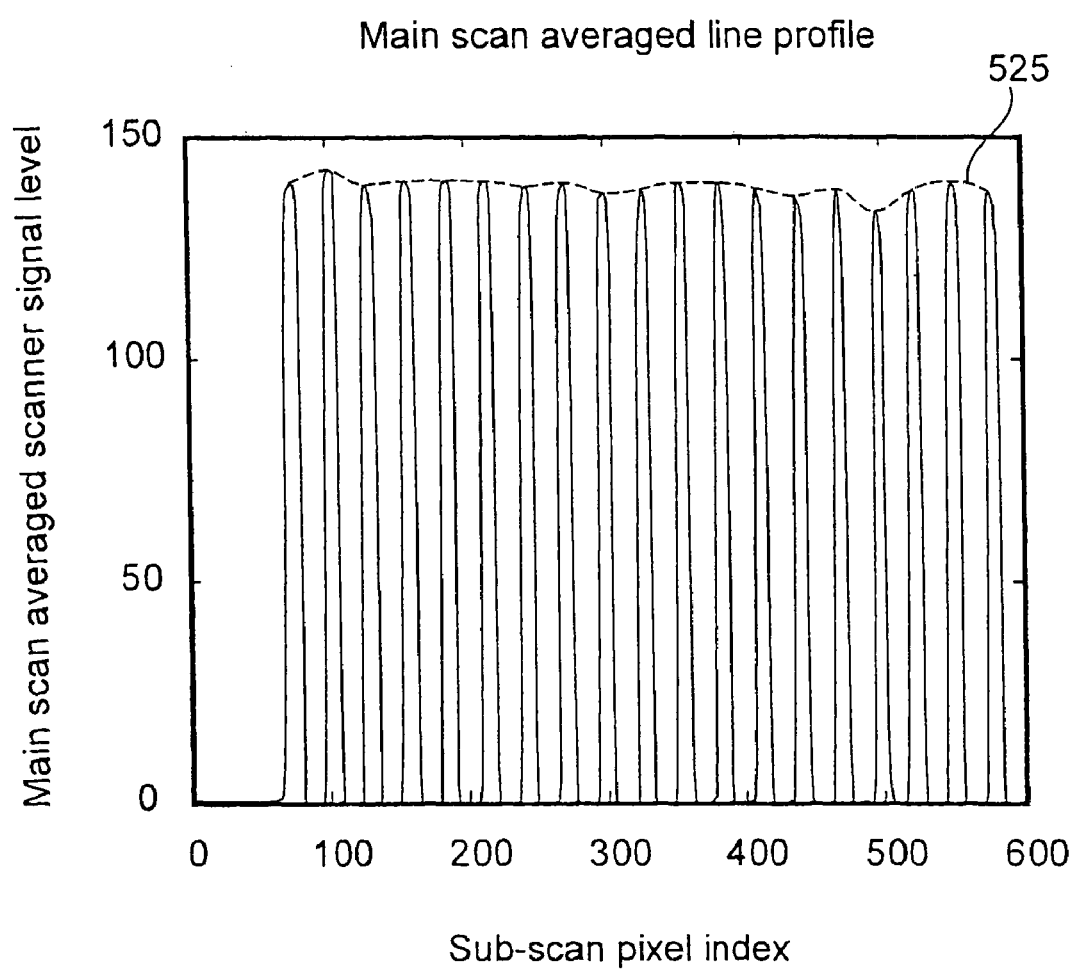
FIG. 11 is a graph of a main-scan averaged line profile.

Referring to FIG. 5, the data from each of the shifted sub-scan lines is averaged in step 350. Interpolated signal levels with the same index k are averaged among the scanner lines:

$$S_k = \frac{1}{M}\sum_{m=1}^{M} \sigma_m(\xi_k)$$

wherein k=1, 2, . . . , N. The result is referred to as the plot profile as shown in FIG. 11 and represents the image properties averaged along the main-scan of the specific regular pattern being analyzed. Where the profile consists of continuous regions of non-zero signal corresponding to a specific color filter feature (i.e. the stripes corresponding to the specific color) separated by zero-signal regions (stripe regions corresponding to the other colors). Each of the non-zero signal regions show variations between each the members of the regular pattern of features as represented by ghosted line 525. These variations can contribute to swath-to-swath and inter-swath banding or non-uniformity. Especially in the case of color filters, such variations can lead to undesired visual results.

The total number of continuous non-zero regions is equal to the number of features of the specific regular pattern imaged per swath, $N_f$ multiplied by the number of imaged swaths in the plot $N_s$. Each of the features of the regular pattern imaged in a given swath will be repeated in a subsequent swath. Each of the non-zero continuous regions can be assigned two indices $n_f=1, \ldots, N_f$ and $n_s=1, \ldots, N_s$ where $n_f$ identifies individual features within each swath and $n_s$ represents individual swaths.

Figure 12:
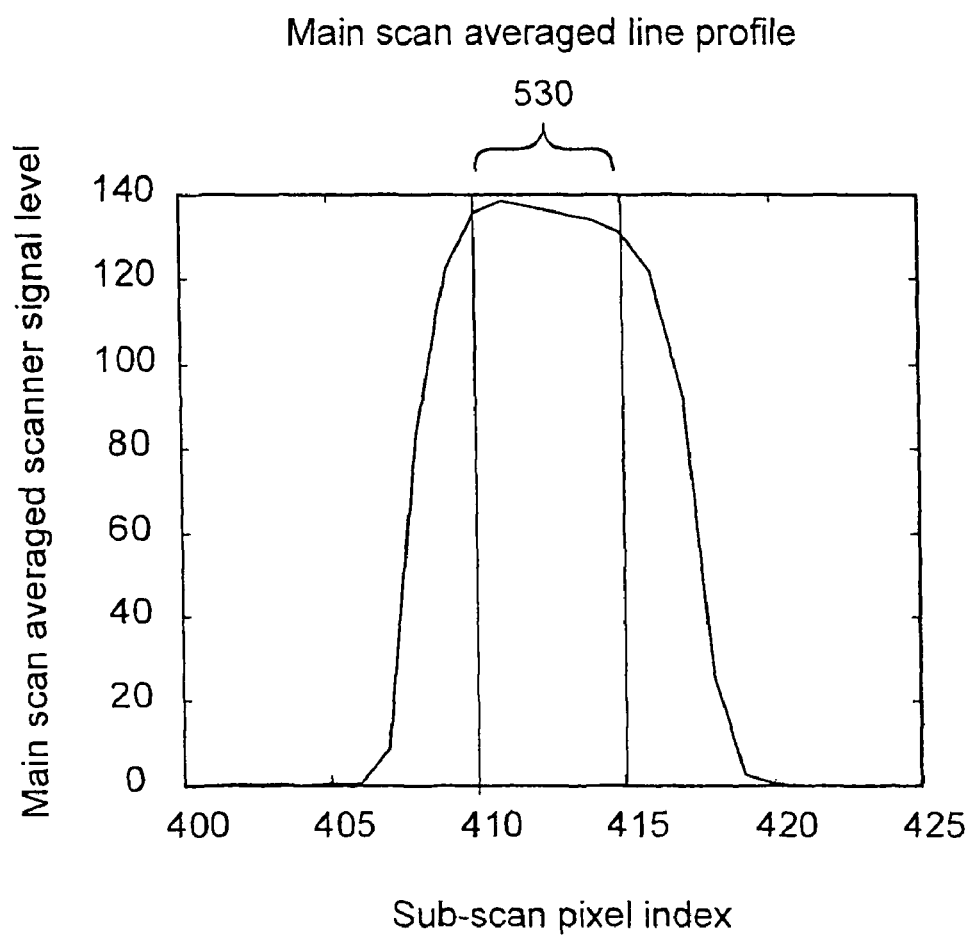
FIG. 12 is an enlarged portion of the graph of FIG. 11.

A signature element $sig(n_f)$ is computed as the average among all non-zero continuous regions with index $n_f$ of the average signal level measured. The average of the signal level may be computed from the middle portion 530 of each region only as shown in FIG. 12 to minimize noise effects and/or artifacts. FIG. 12 shows a detailed view of one of the regions shown in FIG. 11. In the case of color filters it has been experimentally determined that the very edges of the color filter lines tend to contribute to artifacts associated with scattering of light from the line edges. By sampling the center of each region, one may avoid the edge data and increase the quality of the signature elements.

Figure 13:
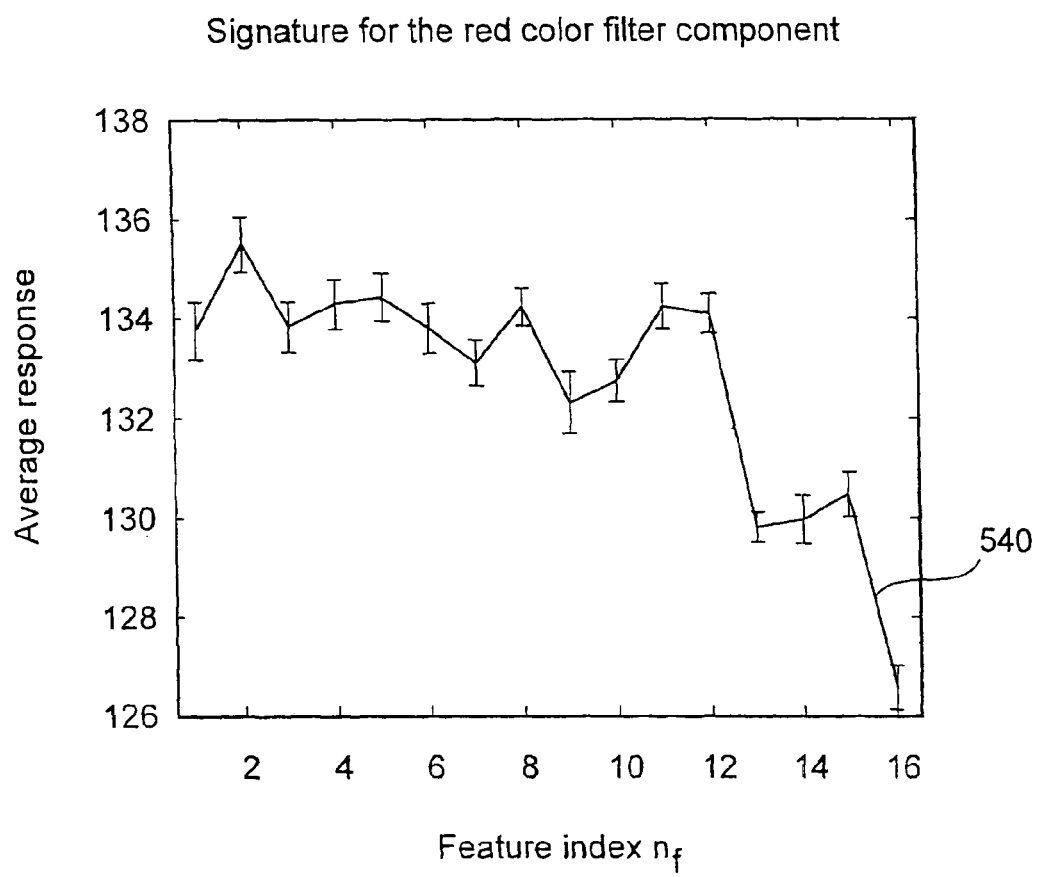
FIG. 13 is a graph of average response as a function of feature index for signature elements in an imaged swath.

The average of the multitude of signature elements from each swath is shown in the "signature" 540 shown in FIG. 13. FIG. 13 shows average response for the plurality of features of a regular pattern (in this case, 16) recorded in each swath imaged by light valve 100.

Referring to FIG. 5, in step 360, image data processor 230 outputs correction instructions to adjust the sub-groups of imaging channels to reduce the differences between the individual signature elements corresponding to the members of the regular pattern that is imaged. In the case of color filters, this process may be carried out each color in the filter. One or more additional test patches may then be generated to confirm the results.

Further degrees of precision may be employed by providing a range of values for each signature element rather than a single average value. The range of number would correspond to the portion of the member of the regular pattern that is imaged by a particular imaging channel within the corresponding sub-group of channels.

The correction instructions may adjust the output radiation characteristics of the multi-channel imaging system, specifically the power of the sub-group of channels corresponding to the specific feature of the regular pattern that was imaged by that sub-group of channels. Such corrections may be generated by searching among the various imaged test patches for the patch with the flattest signature. The signatures from various test patches can be correlated with the variations in the output radiation characteristics used to image each test patch. This may be done using techniques, such as the estimation of transfer functions of output radiation characteristic to measured optical density that are well known to one skilled in the art.

In an example embodiment of the invention, the average power of a given sub-group of imaging channels is adjusted based on the average of the optical density of a portion of the corresponding imaged feature. In another example embodiment of the invention, the average power of a first set of sub-groups of imaging channels are maintained at a constant level while the average power of a second set of sub-groups is varied, allowing the first set of sub-groups to act as a reference. In another example embodiment of the invention, the optical radiation characteristics may be varied periodically in the main scan direction, within a given test patch, preferably at two power levels, and the corresponding optical densities averaged for the two power levels, allowing estimation of the transfer function between power level and optical density. Using such a modulation scheme within a given test patch may enhance the accuracy of estimation of the transfer function. In this regard, any variations within the optical density of the feature itself may be corrected.

It can be appreciated that the methods described herein may be applied to optimize the settings for imaging channels of the sub-groups of imaging channels for imaging a desired regular pattern of features. Each sub-group of pixels corresponds to a specific feature of the regular pattern and is adjusted to ensure that the optical density of that feature will be substantially equivalent to that of other features within the respective swath regardless of any variations that may arise from the location of that feature within the swath. In the case of color filters, uniformity among the color elements is assured, thus advantageously leading to better visual characteristics than would be achieved if the color filter was imaged with a laser array that was calibrated either to provide uniform output radiation levels of all of the imaging channels in the array, or to provide uniform optical properties of a recorded image across the entire width of a swath imaged with all of the imaging channels in the array turned on.

Other embodiments of the invention may employ variations in the process thus disclosed. For example:

Step 350 may average a smaller sub-set of the total M sub-scan lines. Such smaller subsets should be sufficiently large to reduce noise effects that may arise.

In the case of color filter applications, the regular patterns need not be confined to "stripe configurations". Regular patterns comprising mosaic or delta configurations may also be employed as test patches. In these embodiments, the number of sub-scan lines analyzed may not be equal to M (i.e. the entire length of the test patch) but rather may correspond to the length of the subject color element in the main-scan direction. The analysis may be conducted for multiple color elements to average the results. These configurations may however be subject to noise constraints due to the relatively short length of each element.

Instead of analyzing test patches directly, the imaged color donors may be analyzed. Preferably the color donors used to image the test patches are imaged in the same sequence that they would be used in the actual production of the color filter. This approach advantageously allows one to test the actual color filters produced without the need to produce separate test patches thus hindering production. Analyzing a color donor should take into account effects created by any consumption or vaporization of the color that occurs during the actual thermal transfer process.

While the present invention has been described in relation to fabricating displays, the methods described herein are directly applicable to the imaging of any regular pattern including arrays of electronic devices (such as arrays of polymer semiconductors) and lab-on-a-chip (LOC) devices. LOC technology is a rapidly growing research topic within the instrumentation and healthcare industries. The principle is to produce an automated, microscale laboratory to enable sample preparation, fluid handling, analysis and detection steps to be carried out within the confines of a single microchip. LOC chips may have several repeating pattern features.

As will be apparent to those skilled in the art in light of the foregoing disclosure, many alterations and modifications are possible in the practice of this invention without departing from the spirit or scope thereof.

The invention claimed is:

1. A method for calibrating an imaging head comprising a plurality of imaging channels, the method comprising:
   imaging a regular pattern of features within one or more swaths imaged by the imaging head, wherein the regular pattern of features:
   repeats in at least a sub-scan direction, and
   comprises at least a first feature which is imaged by a first portion of the plurality of imaging channels, and second feature which is imaged by a second portion of the plurality of imaging channels, both the first and second portions being less than all of the imaging channels, and both the first feature and the second feature being imaged within a same one of the one or more swaths;
   measuring an optical property of each of the first and second features; and
   based at least in part on the measured optical property, adjusting one or more imaging channels within at least one of:
   the first portion of the plurality of imaging channels, and
   the second portion of the plurality of imaging channels, wherein: the optical properties of the first and second features are made substantially equal upon a subsequent imaging of the regular pattern of features.

2. A method according to claim 1, wherein measuring an optical property of each of the first and second features comprises measuring an optical density of each of the first feature and second features.

3. A method according to claim 2, wherein measuring the optical density of the first and second features comprises measuring the optical density of each of the first and second features in a first main-scan location.

4. A method according to claim 3, comprising measuring the optical density of each of the first and second features in at least a second main-scan location.

5. A method according to claim 4, wherein measuring the optical density of each of the first and second features comprises scanning the first and second features with a scanner system.

6. A method according to claim 5, comprising scanning the first and second features along the sub-scan direction.

7. A method according to claim 6, comprising outputting scanned data from the scanner system, the scanned data comprising at least:
   a first sub-scan line corresponding to the first main-scan location, and
   a second sub-scan line corresponding to the second main-scan location.

8. A method according to claim 7, wherein
   each member of the regular pattern of features comprises at least one of a plurality of colors, and wherein the first and second features both comprise the same color; and
   the method further comprises separating the scanned data to exclude data corresponding to at least a third feature, the at least a third feature having a color different from the color of the first and second features.

9. A method according to claim 7, wherein the regular pattern of features comprises a pattern of color filter features and the method comprises separating the scanned data to exclude data corresponding to at least a fourth feature, the at least a fourth feature corresponding to a portion of a black matrix.

10. A method according to claim 7, comprising aligning the second sub-scan line with the first sub-scan line, wherein data corresponding to the first and second features in the first sub-scan line is aligned in the sub-scan direction with data corresponding to the first and second features in the second sub-scan line.

11. A method according to claim 10, comprising generating a 1D FFT for each of the first and second sub-scan lines to produce corresponding first and second sub-scan line spatial spectra.

12. A method according to claim 11, comprising:
   identifying a dominant peak within each of the spectra;
   determining a phase angle for each of the dominant peaks, and
   aligning the sub-scan lines based on the corresponding phase angles.

13. A method according to claim, 1 wherein the regular pattern of features comprises a plurality of patterns of different color features, the method comprising;
   providing a receiver substrate;
   providing a color donor element for each pattern color; and
   in turn, overlaying the receiver substrate with each color donor element, imaging the color features corresponding to the donor color, and removing the imaged color donor element.

14. A method according to claim 1, wherein:
   the pattern of features comprises a plurality of different colored features and the features for each color are imaged separately;
   the first and second features are imaged from a first color donor element, and
   measuring an optical property of each of the first and second features comprises measuring an optical density of an image on the first color donor element corresponding to each of the first and second features.

15. A method according to claim 1, wherein the regular pattern of features comprises features representing one or more polymer semiconductor elements.

16. An apparatus for calibrating a multiple channel imaging head for imaging a regular pattern of features; wherein the regular pattern of features:
   is imaged within one or more swaths imaged by the imaging head,
   repeats at least in a sub-scan direction, and
   comprises a first feature which is imaged by a first portion of the multiple channels, and a second feature which is imaged by a second portion of the multiple channels, both the first and second portions being less than the total of the multiple channels, and both the first feature and the second feature being imaged within the same swath of the one or more swaths; the apparatus comprising:
   a scanner operable for:
   scanning the first feature and the second feature along the sub-scan direction, and outputting scanned data comprising:
   a first sub-scan line corresponding to a first main-scan location, and
   a second sub-scan line corresponding to at least a second main-scan location, and
   an image data processor, comprising one or more systems controllers, the image data processor operable for:
   aligning the first sub-scan line with the second sub-scan line along the sub-scan direction,
   averaging data corresponding to the first feature in the first sub-scan line with data corresponding to the first feature in the second sub-scan line to produce a first signature element, and
   averaging data corresponding to the second feature in the first sub-scan line with data corresponding to the second feature in the second sub-scan line to produce a second signature element, and correcting any differences between the first signature element and the second signature element by outputting correction instructions operable for adjusting at least one imaging channel within at least one of:

the first portion of the multiple channels, and the second portion of the multiple channels.

17. An apparatus according to claim, 16 wherein the image data processor is further operable for:

generating a 1D FFT for each of the first and second sub-scan lines to produce a corresponding first sub-scan line spatial spectrum and a corresponding second sub-scan line spatial spectrum;

identifying a dominant peak within each of the first and second sub-scan line spatial spectrums, determining a phase angle from each of the dominant peaks, and aligning the first sub-scan line with the second sub-scan line, in accordance with each of the phase angles.

18. An apparatus according to claim 16, wherein the one or more swaths comprise a first swath and a second swath, the first and second features are imaged within each of the first and second swaths;

and wherein the image data processor is further operable:

for averaging the first signature element corresponding to the first swath with the first signature element corresponding to the second swath to produce an averaged first signature element, and averaging the second signature element corresponding to the first swath with the second signature element corresponding to the second swath to produce an averaged second signature element.

19. An apparatus according to claim 18, wherein the image data processor is operable for: correcting any differences between the averaged first signature element and the averaged second signature element by outputting additional correction instructions operable for adjusting the at least one imaging channel.

20. A method for calibrating a multi-beam imaging system for the production of images each comprising a regular pattern of features having a predetermined spacing in a sub-scan direction, the method comprising:

providing test image data specifying a test pattern, the test pattern comprising a plurality of features that have the predetermined spacing in the sub-scan direction;

operating the imaging system according to the test image data to image the test pattern onto a substrate such that a plurality of the features of the test pattern are imaged in a single swath of the imaging system;

optically scanning the swath of the test pattern, identifying the plurality of features in the swath, and obtaining difference data representing differences in optical properties among the plurality of features; and, based at least in part on the difference data, adjusting one or more properties of at least one of the beams corresponding to one of the imaged features so as to reduce the differences in optical properties among the plurality of features.

* * * * *